United States Patent [19]

Hyman et al.

[11] Patent Number: 4,633,103

[45] Date of Patent: Dec. 30, 1986

[54] TWO CELL STIMULATED RAMAN SCATTERING FREQUENCY CONVERSION LASER

[75] Inventors: Howard A. Hyman, Belmont; Daniel W. Trainor, Reading, both of Mass.

[73] Assignee: Avco Everett Research Laboratory, Inc., Everett, Mass.

[21] Appl. No.: 491,341

[22] Filed: May 4, 1983

[51] Int. Cl.$^4$ .............................................. H03F 7/00
[52] U.S. Cl. .................................... 307/426; 372/3
[58] Field of Search ................... 307/424, 426; 372/3

[56] References Cited

U.S. PATENT DOCUMENTS

| | | | |
|---|---|---|---|
| 3,881,115 | 4/1975 | Hodgson et al. | 307/88.3 |
| 4,136,318 | 1/1979 | Kurse, Jr. | 331/94.5 N |
| 4,280,109 | 7/1981 | Stappaerts | 331/94.5 N |

OTHER PUBLICATIONS

"Optical Pulse Compressor Systems for Laser Fusion", Ewing et al, *IEEE J. of Quantum Electronics*, vol. QE-15, No. 5, May 1979.

*Primary Examiner*—William L. Sikes
*Assistant Examiner*—Robert E. Wise
*Attorney, Agent, or Firm*—Melvin E. Frederick

[57] ABSTRACT

A laser method of and apparatus for providing a wide variety of laser wavelenghts wherein a pump source of laser radiation is sequentially Strokes-shifted in two separate cells each containing a different molecular or atomic Raman active gas, wherein each cell is optimized to produce primarily first-Stokes radiation as by variation of focal length parameters and/or gas pressure, filter means are provided at the output of the first cell to reject the pump laser radiation and to pass the first-Stokes radiation of the first cell and further filter means are provided at the output of the second cell to reject the first-Stokes radiation of the first cell and pass the first-Stokes radiation of the second cell to provide a desired output laser radiation.

9 Claims, 3 Drawing Figures

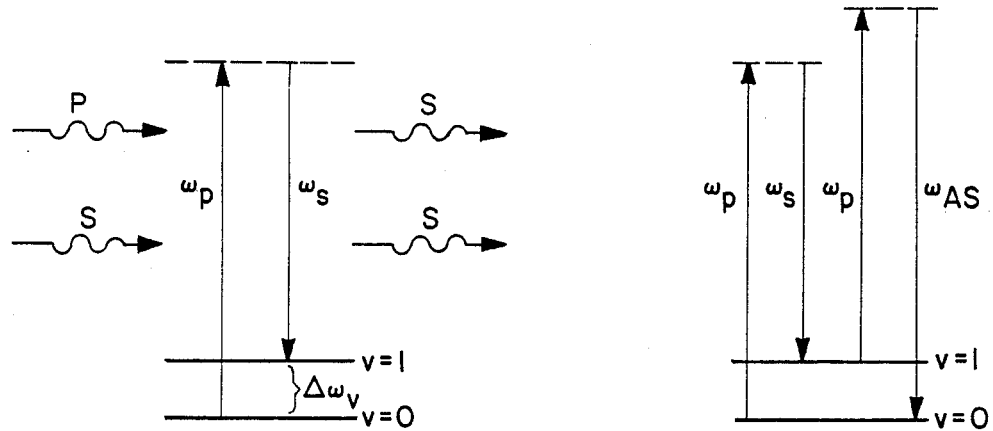
_Fig 1_   _Fig 2_
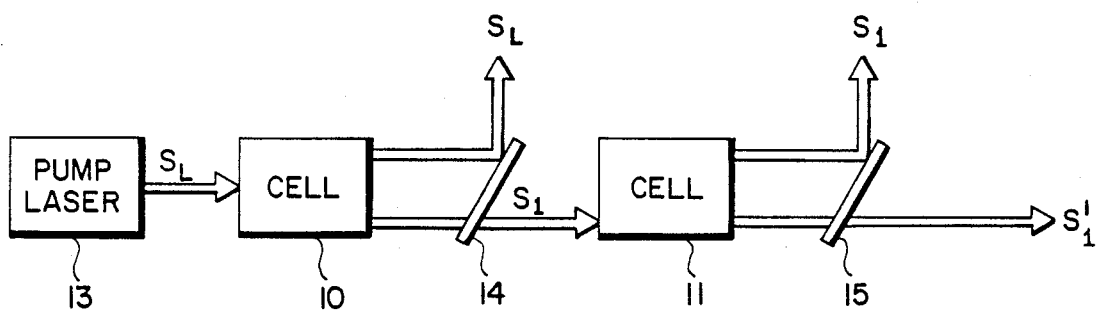
_Fig 3_

TWO CELL STIMULATED RAMAN SCATTERING FREQUENCY CONVERSION LASER

BACKGROUND OF THE INVENTION

The Raman effect was first discovered by Sir C. V. Raman in 1928. He observed that when a substance (solid, liquid, or gas) is irradiated by a monochromatic light whose frequency does not correspond to any of the absorption lines of the substance, frequency shifted components can be detected in the scattered radiation. These shifted components, or Raman lines, have shifts independent of the irradiation frequency but characteristic of the material itself. The shifted lines on the low frequency side were also mirrored by shifted lines on the high frequency side, although the latter were less intense.

These phenomena describe what is commonly termed spontaneous Raman scattering. This process involves an inelastic scattering mechanism in which a photon incident on an atom or molecule causes it to undergo a change in internal energy. In the case of an atom, this internal energy is in the form of an electronic transition. However, the scatterer can be a molecule in which case the change in internal energy is in the form of a vibrational and/or rotational transition. The scattered photon is thus shifted by the exact change in internal energy. If a molecule is originally in the ground vibrational state, Raman scattering will shift the scattered photon to longer wavelengths at an energy $E=h(\nu_o-\nu_{vib})$, where $\nu_o$ is the frequency of the incident photon (also called the pump photon) and $\nu_{vib}$ is the frequency of the vibrational transition. If the scattering molecule is originally in a vibrationally excited state, the scattered photon may be shifted to shorter wavelengths at an energy $E=h(\nu_o+\nu_{vib})$. Photons which are downshifted in energy, leaving the scattering molecule in a higher vibrational state, are called Stokes photons. Photons which are upshifted by the Raman process are conversely called anti-Stokes photons.

Stimulated Raman scattering (SRS) is the stimulated analog to the spontaneous Raman effect. This occurs when the presence of the Stokes photons stimulates the interaction of pump photons with the Raman active media creating more Stokes photons. Classically, the stimulated Raman process can be thought of as the constructive interference between incident radiation and that at a Stokes shift which further drives material oscillations. This effectively creates an exponential gain for the scattered Stokes wave at the cost of the incident pump wave.

The stimulated Raman process is characterized by an intensity threshold above which gain at various Stokes frequencies $\nu_o-\nu_{vib}$ can be induced. Usually only the vibrational transition having the largest spontaneous Raman intensity per line width is "active" in a particular molecule. The stimulated scattering process is a coherent scattering process in which, provided the input intensity exceeds threshold, a significant number of pump photons are scattered into various Stokes components.

A simple method for achieving the necessary threshold intensities for SRS is by using a laser as the pump and focusing the beam through the scattering medium. In this case, the gain near the focus can be high enough that spontaneous Raman scattering provides sufficient input for the stimulated process. The resulting stimulated emission is along the forward and backward directions of the incident beam, since these have the highest gain-length product. When the laser bandwidth is larger than the spontaneous Raman line width of the molecules (or atoms), the stimulated Raman emission takes place mostly in the forward direction. Energy conversions of incident pump to Stokes shifted output of greater than 50% have been observed.

One application of stimulated Raman scattering, especially in the forward direction, lies in this ability to efficiently convert radiation at one wavelength to another wavelength. Thus, for example, high efficiency rare gas-halide lasers, with output in the ultraviolet, have been shifted into other spectral regions via SRS.

Since the discovery of rare-gas halide lasers in 1975, considerable effort has been expended in using the stimulated Raman scattering (SRS) process in conjunction with these efficient, high power devices to achieve broad ultraviolet and visible wavelength coverage.

SUMMARY OF THE INVENTION

The invention described here allows the Raman shifting of the output of a high power laser to obtain a wide variety of wavelengths with high overall conversion efficiency. This is accomplished in accordance with the invention whereby a pump source of laser radiation is sequentially Stokes-shifted in two separate cells each containing a different molecular or atomic Raman active gas, wherein each cell is optimized to produce primarily first-Stokes radiation as by variation of focal length parameters and/or gas pressure, filter means are provided at the output of the first cell to reject the pump laser radiation and to pass the first-Stokes radiation of the first cell and further filter means are provided at the output of the second cell to reject the first-Stokes radiation of the first cell and pass the first-Stokes radiation of the second cell to provide a desired output laser wavelength.

BRIEF DESCRIPTION OF THE DRAWINGS

FIG. 1 is an energy level diagram illustrating the stimulated Raman process;

FIG. 2 is an energy level diagram illustrating in addition to the stimulated Raman effect of FIG. 1, the competitive, parametric, four-wave processes that can occur whenever there is a sufficiently intense pump field; and FIG. 3 is a block diagram of an embodiment of a laser in accordance with the invention.

DETAILED DESCRIPTION OF THE INVENTION

The basic physics of the stimulated Raman effect has been reviewed at length in the literature. However, to facilitate understanding of the invention, briefly consider now some of the features most relevant to the invention. For concreteness, molecular hydrogen will be taken by way of example as a "typical" Raman active gas. The stimulated Raman scattering (SRS) process is shown schematically in FIG. 1. As shown in FIG. 1, a pump and a Stokes photon simultaneously scatter off a ground-state (v=0) $H_2$ molecule, producing two (coherent) Stokes photons and a vibrationally-excited (v=1) molecule (for $H_2$, $\Delta\omega_v=4155$ cm$^{-1}$) The Stokes field is thus amplified at the expense of the (laser) pump field. For the process shown in FIG. 1 (i.e., neglecting higher order Stokes emission and four-wave processes), the growth of the Stokes intensity ($I_s$) as a function of distance (z) along a Raman cell can be written as $$I_s(z) = I_{so} \frac{\exp(gI_{po}z)}{1 + (\omega_p I_{so}/\omega_s I_{po})\exp(gI_{po}z)} \quad (I_{po} >> I_{so})$$

where $I_{po}$ is the initial (z=0) pump intensity, g is the Raman gain coefficient, and $I_{so}$ is the initial Stokes intensity, which, under typical conditions, is provided by spontaneous Raman scattering of the pump. It has been assumed that $I_{po} >> I_{so}$, although this is not a necessary assumption. From the equation set forth above, in the limit of small z, $I_s \sim I_{so} \exp(gI_{po}z)$, while for large z, $I_s \rightarrow (\omega_s/\omega_p)I_{po}$. Thus, as may now be seen, in principal, for sufficient cell length, all of the pump photons can be converted to Stokes photons. In fact, as the first Stokes (i.e., $\omega_{s1} = \omega_p - \Delta\omega_v$) intensity builds up, it acts as a "pump" field to stimulate second Stokes (i.e., $\omega_{s2} = \omega_{s1} - \Delta\omega_v$) photons, etc. Therefore, ideally, all of the initial pump photons can be converted by sequential SRS processes to any desired Stokes order, simply by choosing an appropriate cell length. In practice, however this is not so easily accomplished, due to competing processes, e.g., four-wave parametric mixing.

In addition to the stimulated Raman effect, competitive parametric, four-wave processes can occur. An example of such a process is shown in FIG. 2. As shown in FIG. 2, the two pump photons mix with a first-Stokes photon to produce an anti-Stokes (i.e., $\omega_{As} = \omega_p + \Delta\omega_v$) photon. An important feature of four-wave mixing is that phase-matching is required to conserve momentum. Dispersion in the medium, combined with the fact that the various fields are at different wavelengths, makes it necessary for the fields to "find" appropriate propagation directions to allow phase-matching to occur. This often leads to the well-known conical or annular rings at the output of a Raman cell, characteristic of Stokes/anti-Stokes emission generated by four-wave processes. Once several strong fields are present, a large number of four-wave combinations become possible, typically leading to a multitude of Stokes and anti-Stokes output waves. This phenomenon has, in fact, been used as the basis for commercial devices which utilize Stokes/anti-Stokes scattering in $H_2$ to convert a given laser frequency into a variety of output wavelengths.

From the above discussion, it can be shown that for a fixed pump laser frequency $\omega_L$, only output at the frequencies $\omega_0 = \omega_L \pm N\Delta\omega_v$ (where N is the Stokes/anti-Stokes order) can be generated with a particular Raman-active medium. Further, the effectiveness of the four-wave processes (which also couple back non-linearly into direct stimulated Raman scattering) in producing a multi-wavelength output, makes the conversion efficiency from input laser energy to the energy at one particular output wavelength very small.

Referring now to FIG. 3, there is shown two cells 10 and 11 filled with two different molecular or two different atomic gases or one molecular and one atomic gas as may be required to achieve the desired output laser beam wavelength. The atomic SRS process is generally similar to that previously discussed for the molecular case, the excited v=1 level (see FIG. 1) being replaced by an intermediate electronic state lying above the ground state. A pump laser beam $S_L$ from a suitable pump laser 13 propagates through the first cell 10, where it undergoes SRS with high efficiency to produce in cell 10 first-Stokes radiation $S_1$ appropriate to the molecule or atom. Filter means 14 which may comprise a dichroic element is used to reject the pump laser beam $S_L$ that is not converted and to pass the first-Stokes radiation $S_1$. The $S_1$ radiation then passes through the second cell 11, where it now acts as a pump beam to generate in the second cell 11 first-Stokes $S'_1$ emission, with the Raman shift of the molecule or atom in this cell. The second filter means 15 rejects the first-Stokes radiation $S_1$ of cell 10 and passes the first-Stokes radiation $S'_1$ generated in cell 11. It is important to note that in accordance with the invention, both cells are individually optimized to produce primarily first-Stokes radiation. The generation of first-Stokes emission is essential and is achieved by exceeding the gas threshold. This may, for example, be accomplished by variation of the input beam intensity, cell length and/or gas pressure. Input beam intensity may be varied or a chosen intensity selected at least in part by varying the focal length of the input laser beam. Gas pressures of about ten atmospheres, for example, may be required for hydrogen. Unless a high temperature is required to maintain a gas, such as, for example, a metallic gas, the gases need be at only about room temperature. The overall conversion efficiency from the pump laser beam $S_L$ to $S'_1$ is high. By way of example, the output of an XeF* laser ($\lambda$ — 353 nm) using $H_2$ and $D_2$ [i.e., $\lambda(XeF^*) \rightarrow \lambda(S_1$ of $D_2) \rightarrow \lambda(S_1$ of $H_2)$] may be shifted to obtain blue-green radiation for application to ocean water communications and the like. The overall efficiency for XeF* input→blue-green output via this two-step, two-cell method may be expected to be $\geq 20\%$.

Lasers in accordance with the present invention have two principal advantages over other SRS frequency conversion methods. First, a wider variety of wavelengths can be accessed, for a given input laser frequency, since one is not limited to the Stokes shifts associated with a single molecular or atomic gas. Second, the output wavelength is produced with high overall efficiency, since each cell is constrained to primarily generate first-Stokes radiation. Minimizing the number of strong fields simultaneously present in the Raman cell in this manner serves to suppress the four-wave interactions, thereby providing control over these parametric processes. By optimizing on the single SRS process of pump laser beam first-Stokes radiation, high conversion efficiencies can be achieved.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. Laser apparatus for converting a beam of radiation from a laser at a different wavelength comprising:
   (a) means for producing a first pump laser output beam of first frequency;
   (b) first cell means filled with a first molecular or atomic gas for receiving said first pump laser beam and transparent thereto, said first gas when irradiated by a pump laser beam at said first frequency producing via SRS a first first-Stokes laser beam of second frequency containing at least a substantial portion of the energy of laser beams produced in said first cell means;

(c) first means for directing said first pump laser beam into and through said first cell means, said first pump laser beam undergoing SRS to produce said first first-Stokes laser beam of second frequency;

(d) first filter means for receiving said first first-Stokes laser beam and said pump laser beam from said first cell and transmitting substantially only said first first-Stokes laser beam;

(e) second cell means filled with a second molecular or atomic gas for receiving said first first-Stokes laser beam and transparent thereto, said second gas when irradiated by a laser beam at said second secondary frequency producing via SRS a second first-Stokes laser beam of third frequency containing at least a substantial portion of the energy of laser beams produced in said second cell means;

(f) second means for directing said first first-Stokes laser beam into and through said second cell means, said first first-Stokes laser beam undergoing SRS to produce said second first-Stokes laser beam of third frequency; and (g) second filter means for receiving said second first-Stokes laser beam and first first-Stokes laser beam from said second cell and transmitting substantially only said second first-Stokes laser beam.

2. Laser apparatus as called for in claim 1 wherein said pump laser means includes means for controlling the focal length of its output beam as it enters said first cell.

3. Laser apparatus as called for in claim 2 wherein said first cell has a length and an internal pressure that in combination with said pump laser output beam exceeds the threshold of the gas in said cell and produces said first first-Stokes laser beam.

4. Laser apparatus as called for in claim 3 wherein said first and second filter means are dichroic filters.

5. Laser apparatus as called for in claim 4 wherein the gas in said first and second cell is selected to produce a said second first-Stokes laser beam having a predetermined wavelength.

6. Laser apparatus as called for in claim 5 wherein the wavelength of said second first-Stokes laser beam is in the blue-green region.

7. The method of converting a beam of radiation from a laser into radiation at a different wavelength comprising:

(a) producing a first pump output laser beam of first frequency;

(b) directing said pump laser beam through a first cell filled with a first molecular or atomic gas for receiving said first pump laser beam and transparent thereto, said first gas when irradiated by a pump laser beam at said first frequency producing via SRS a first first-Stokes laser beam of second frequency containing at least a substantial portion of the energy of laser beams produced in said first cell means, said first pump laser beam into and through said first cell means, said first pump laser beam undergoing SRS in said first cell to produce said first first-Stokes laser beam of second frequency;

(c) receiving said first first-Stokes laser beam and pump laser beam from said first cell and transmitting substantially only said first first-Stokes laser beam;

(d) directing substantially only said first first-Stokes laser beam through second cell means filled with a second molecular or atomic gas for receiving said first first-Stokes laser beam and transparent thereto, said second gas when irradiated by a laser beam at said second frequency producing via SRS a second first-Stokes laser beam of third frequency containing at least a substantial portion of the energy of laser beams produced in said second cell means;

(e) directing said first first-Stokes laser beam into and through said second cell means, said first first-Stokes laser beam undergoing SRS to produce said second first-Stokes laser beam of third frequency; and (f) receiving said second first-Stokes laser beam and said first first-Stokes laser beam from said second cell and transmitting substantially only said second first-Stokes laser beam.

8. The method as called for in claim 7 wherein the focal length of each laser beam entering each cell, each cell length and the pressure within each cell is selected to produce said first-Stokes laser beam in each cell.

9. The method as called for in claim 8 wherein the gas in said first and second cell is selected to produce said second first-Stokes laser beam in the blue-green region.

* * * * *